United States Patent [19]
D'Hont et al.

[11] Patent Number: 5,453,747
[45] Date of Patent: Sep. 26, 1995

[54] TRANSPONDER SYSTEMS FOR AUTOMATIC IDENTIFICATION PURPOSES

[75] Inventors: Loek D'Hont, Almelo; Anne Tip, Overdinkel, both of Netherlands; Herbert Meier, Moosburg, Germany

[73] Assignees: Texas Instruments Deutschland GmbH, Germany; Texas Instruments Holland B.V., Netherlands

[21] Appl. No.: 276,273

[22] Filed: Jul. 18, 1994

Related U.S. Application Data

[63] Continuation of Ser. No. 83,808, Jun. 28, 1993, Pat. No. 5,351,052.

[51] Int. Cl.⁶ ..................................................... G01S 13/74
[52] U.S. Cl. ........................................ 342/42; 342/51
[58] Field of Search .................... 342/42, 51; 340/901, 340/905

[56] References Cited

U.S. PATENT DOCUMENTS

| | | | |
|---|---|---|---|
| 4,075,632 | 2/1978 | Baldwin et al. | 342/42 |
| 4,926,182 | 5/1990 | Ohta et al. | 342/51 |
| 5,128,669 | 7/1992 | Dadds et al. | 340/901 |

Primary Examiner—Mark Hellner
Attorney, Agent, or Firm—Brian C. McCormack; James C. Kesterson; Richard L. Donaldson

[57] ABSTRACT

A method of communicating between an interrogator (10) and at least a first and second transponder (12). The transponders (12) are separately located within a first and a second vehicle (20) travelling within a first and a second traffic lane, respectively. The method has the steps of providing a first and a second LF antenna (16) associated with and proximity to a first and a second traffic lane, respectively. From each of the first and second LF antennas (16) a continuous LF subcarrier is transmitted to serve as a clock signal for each antenna's associated transponder (12). Initially, a wake-up signal is sent by each of the LF antennas (16) to its associated transponder (12). Following the wake-up signal, a unique lane code is sent by each of the LF antennas (16) to its associated transponder (12). The transponder (12) stores its unique lane code in its memory (70). The transponder then sends a UHF response in a predetermined time period depending on the unique lane code stored in each of the transponders (12). The time period in which the transponder (12) sends its UHF response is unique to that transponder (12) so that interference between responding transponders (12) is avoided. Other devices, systems and methods are also disclosed.

17 Claims, 3 Drawing Sheets

TRANSPONDER SYSTEMS FOR AUTOMATIC IDENTIFICATION PURPOSES

CROSS-REFERENCE TO RELATED PATENTS

This is a continuation of application Ser. No. 08/083,808 filed Jun. 28, 1993, now U.S. Pat. No. 5,351,052.

The following coassigned patent applications are hereby incorporated herein by reference:

| Pat No./Appl. No. | Filing Date | TI Case No. |
| --- | --- | --- |
| Pending 5,053,774 | 2/13/91 | TI-12797A |
| Pending 07/981,635 | 11/25/92 | TI-16688 |

FIELD OF THE INVENTION

This invention generally relates to a transponder arrangement in which an interrogator communicates with a transponder using two data communication channels.

BACKGROUND OF THE INVENTION

Many methods are known in this field for communicating between an interrogator and a transponder. An early prior art patent (U.S. Pat. No. 3,713,148) issued to Cardulio et al. describes a system in which an interrogation signal is sent at a first frequency and a transponder responds to this interrogation signal with a response signal of a second frequency. It is common in the prior art to use the interrogation signal at the first frequency as a powering signal so the transponder can operate without a power source of its own. Schuermann et al. in U.S. Pat. No. 5,053,774 describe a system and method by which a single frequency can be used for the powering of the transponder as well as bidirectional communication between the interrogator and the transponder. Schuermann et al. use a half-duplex system such that a single antenna may be used in each of the interrogator and the transponder for bidirectional communication and for powering.

SUMMARY OF THE INVENTION

It is desirable when communicating between an interrogator and a transponder to be able to provide two data communication channels between the interrogator and transponder. Some advantages of having two data communication channels include: frequency diversity, increased data throughput, separation of data and control communications, and use of a more robust, lower frequency channel for the critical low data rate control signals.

Generally, and in one form of the invention, a method is described for communicating between an interrogator and at least a first and second transponder. The transponders are separately located within a first and a second vehicle travelling within a first and a second traffic lane, respectively. The method has the steps of providing first and second LF antennas associated with and proximity to a first and a second traffic lane, respectively. From each of the first and second LF antennas a continuous LF subcarrier is transmitted to serve as a clock signal for each antenna's associated transponder. Initially, a wake-up signal is sent by each of the LF antennas to its associated transponder. Following the wake-up signal, a unique lane code is sent by each of the LF antennas to its associated transponder. The transponder stores its unique lane code in its memory. The transponder then sends a UHF response in a pre-determined time period depending on the unique lane code stored in each transponder. The time period in which the transponder sends its UHF response is unique to that transponder so that interference between responding transponders is avoided. Other devices, systems and methods are also disclosed.

BRIEF DESCRIPTION OF THE DRAWINGS

Corresponding numerals and symbols in the different figures refer to corresponding parts unless otherwise indicated.

DETAILED DESCRIPTION OF PREFERRED EMBODIMENTS

Figure 1:
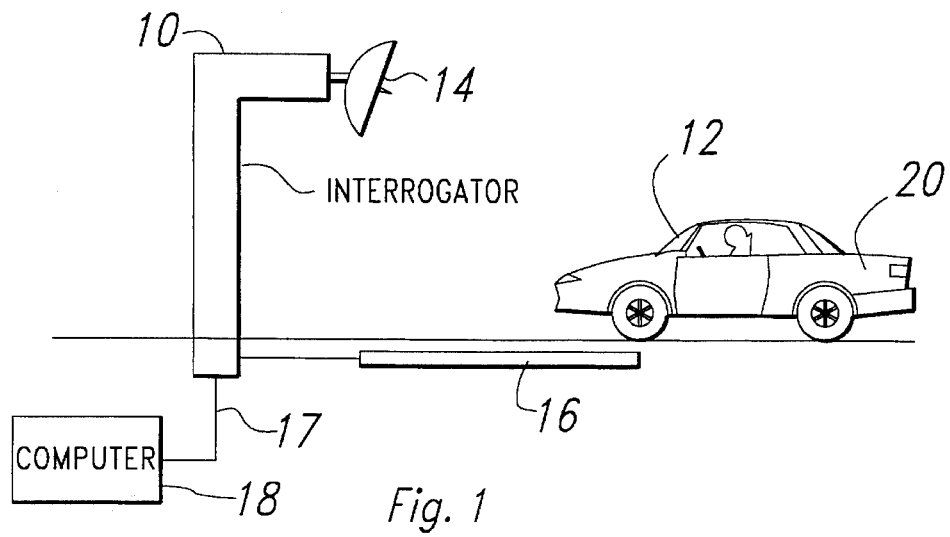
FIG. 1 is a block circuit diagram of a preferred arrangement of an interrogation unit and a transponder unit.

Referring now to FIG. 1, the transponder arrangement to be described includes an interrogator 10 and a responder unit 12. The interrogator 10 is located within a toll plaza 11 and may be connected by a data bus 17 to a toll plaza computer 18. The transponder or tag 12 is located within a vehicle 20.

In a typical application, a number of interrogators 10 may be located within the toll plaza 11. Each interrogator 10 would be associated with a vehicle lane. Under the control of toll plaza computer 18 the interrogator 10 will make inquiries to determine information about vehicles 20 traveling within their associated lanes. Such information such as vehicle identity and billing information can be communicated between the interrogator 10 and the transponder 12. In this manner, a great variety of functions can be carried out conveniently for operators and users of this equipment.

In a preferred embodiment of this invention, two data communication channels are used for each interrogator 10. This embodiment uses a low frequency (LF) channel in the 300 kHz band. A high frequency channel is provided in the 915 MHz ultra high frequency (UHF) band. These channels have been chosen in the illustrated embodiment because they are in FCC-approved bands. However, the invention described herein can be applied to other desired frequency bands. In this example, the LF up-link channel will only be used to send controlled data to the transponder 12 with an example baud rate of 36 kilobits per second. The UHF channel can interchange data bidirectionally to and from the transponder 12 with the illustrated baud rate of 300 kilobits per second. In principle, the LF band could also be used bidirectionally to send data to and from the transponder 12. The interrogator UHF antenna 14 and LF antenna 16 are also shown in FIG. 1. Preferably there is a phase correlation between the baud rate and the 300 kHz LF carrier so that a data "high" or "low" is an integer number of 300 kHz periods.

A pulse-width encoding scheme may be used for the 36 kbps data modulation of the 300 kHz LF carrier. Alternatively, a true-AM method, which leaves a rest-carrier, may be used. The latter may be advantageous in allowing a more reliable data recovery in the transponder 12 because the carrier can be used as a reference signal in a synchronous AM demodulator 60. The carrier can also be used as a reference clock signal for the transponder controller 56.

The availability of a reference carrier opens the possibility of using Phase-Amplitude Modulation (PAM) for the LF up-link channel. This PAM modulation scheme in combination with bit grouping techniques could yield a LF data speed increase of a factor of four or greater in the same bandwidth. The relative complexity of this bit grouping, however, may require a transponder controller 56 and transponder demodulator 60 of greater complexity to demodulate the received LF uplink message.

To allow a more robust data demodulation, the LF and UHF carrier signals are phase-locked to each other in the toll plaza 11. An optional phase-lock in the transponder 12 between the LF and UHF carrier can also be carried out. Alternatively, the UHF carrier signal and the LF carrier signal may be implemented with no phase-lock between them. This, however, could make data demodulation more difficult for noisier signals.

Figure 2:
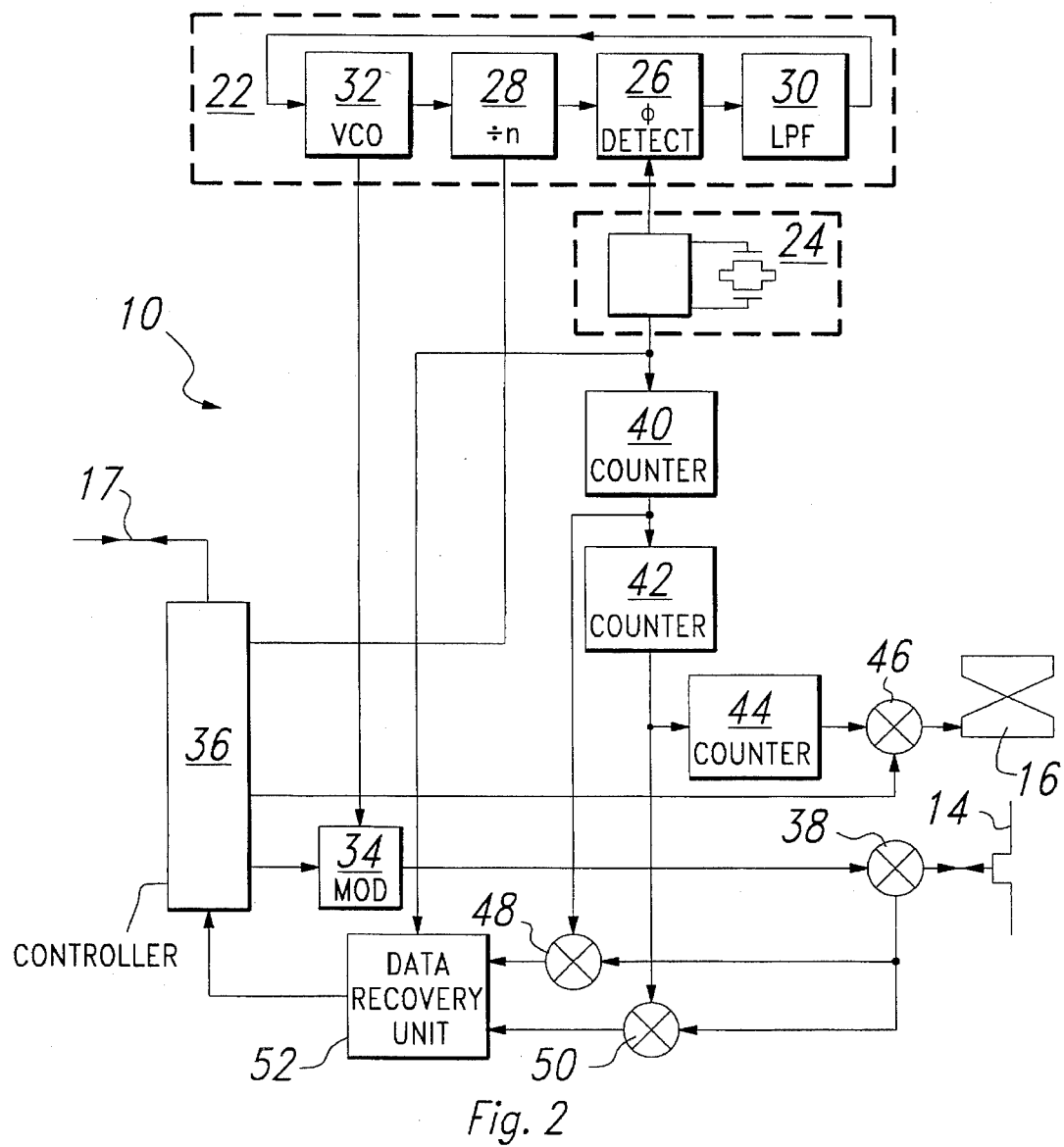
FIG. 2 is a block circuit diagram of the interrogator according to the invention.

The interrogator 10 of the preferred embodiment will now be described with respect to FIG. 2. A phase-locked loop (PLL) 22 is provided to generate a number of selectable UHF channel carriers as well as the LF carrier. In the preferred embodiment, eight UHF channel carriers are provided having a channel separation of 3.6 MHz. The PLL 22 receives its frequency reference from a 3600 kHz crystal oscillator 24. Phase-lock loop configurations are well known in the art. The classic PLL configuration is shown here. This configuration comprises a phase detector 26 with two input frequencies. The first input frequency is the carrier from the crystal oscillator 24 and the second is that of a divided clock frequency received from a programmed divider 28. The phase detector 26 generates an output that is a measure of the phase difference between the two input frequencies. If the two input frequencies are not equal, a phase-error signal is output from the phase detector 26 and passes through a lowpass filter 30 into a voltage controlled oscillator 32. The phase-error signal after being filtered causes the voltage controlled oscillator 32 frequency to deviate in the direction of the crystal oscillator 24 frequency.

The PLL clock is provided to a UHF modulator 34. This PLL clock provides a carrier upon which the modulator 34 might modulate data provided to it from the interrogator controller 36. The modulator 34 preferably uses DSB-AM modulation. From the UHF modulator 34, this UHF up-link signal is supplied to a direct-conversion balanced modulator 38. This modulator 38 then places the UHF up-link signal onto the UHF antenna 14 to form a UHF up-link message. By selecting the division factor of the PLL divider 28, the interrogator controller 36 may select which of the eight of carrier frequencies is used as the carrier for this UHF up-link message.

Besides supplying a reference carrier to the PLL 22, the 3600 kHz crystal oscillator 24 also provides its output to a divide-by-three counter 40 that in turn provides its output to a divide-by-two counter 42 that in turn provides its output to another divide-by-two counter 44. The exact function of these various counters 40,42,44 will be described in greater detail later. The output of the final or second divide-by-two counter 44 is provided to a LF up-link modulator 46 to serve as the LF carder frequency. LF up-link modulator 46 takes this 300 kHz signal and modulates data from the interrogator controller 36 upon it. The LF up-link modulator 46 then passes this LF modulated carrier to the LF antenna 16.

The UHF down-link message is received by the UHF antenna 14. This message then passes through the direct-conversion balanced modulator 38 that in turn passes the, signal on to a first and second mixer 48,50. This signal as received is preferably frequency shift keying modulated. Frequency shift keying is a technique well known in the art in which the first polarity of a binary signal is represented by a first frequency and the second polarity of a binary signal is represented by a second frequency. The first and second mixers 48,50 operate with the data recovery unit 52 to demodulate an FSK down-link message in which a binary "0" is represented by a 600 khz signal and a binary "1" is represented by a 1200 kHz signal. In this example, the fist mixer 48 demodulates the first polarity signal by combining the 1200 kHz output of the divide-by-three counter 40 with the input signal. The second mixer 50 combines the 600 kHz output of the first divide-by-two counter 42 with the input signal. The use of the carriers received from the divide-by-three counter 40 and the first divide-by-two counter 42, is shown in the text, *Introduction to Communication Systems*, second edition by Ferrell Stremler on pages 574–575. The UHF carrier and LF carrier could also be generated by local oscillators without a phase lock between them.

The 915 MHz UHF up-link message is preferably amplitude modulated by the interrogator UHF modulator 34.

An alternative to the direct-conversion balance modulator 38 might be a multi-heterodyne receiver. A multi-heterodyne receiver might yield a better large-signal response and a better channel separation.

The frequencies and divider ratios described above are merely exemplary. Other frequencies and divider ratios could be used to advantage upon reference to the specification and claims set forth in this application.

Figure 3:
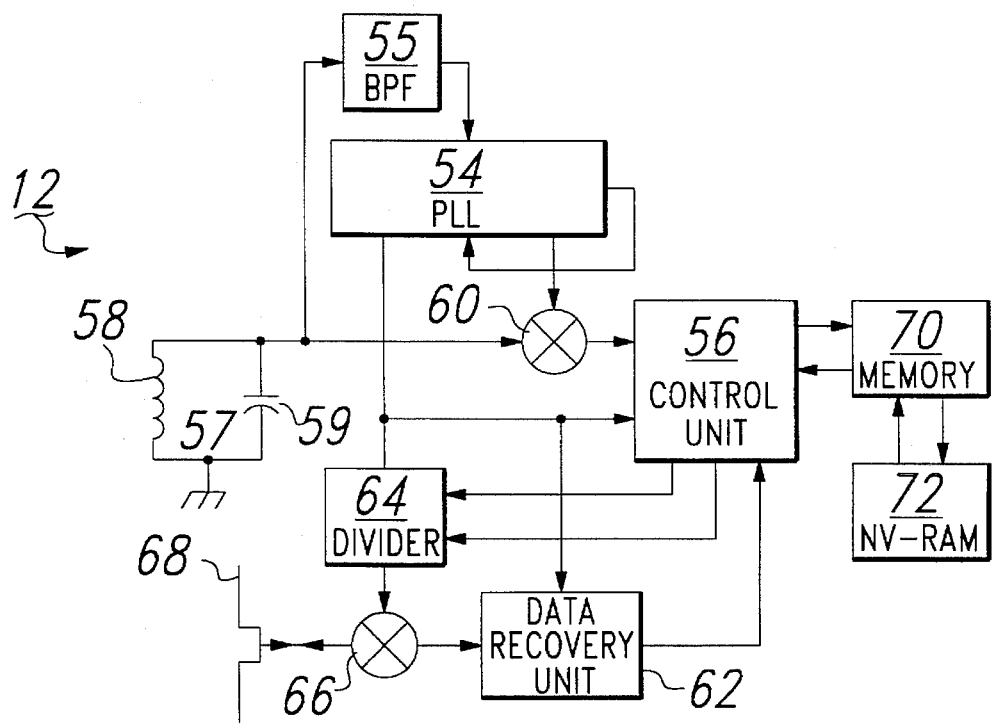
FIG. 3 is a block circuit diagram of the transponder according to the invention.

Referring now to FIG. 3, the components of the transponder 12 will be described. Like the interrogator 10, the transponder 12 also has a PLL 54. The PLL 54 of the transponder 12 is synchronized to the received LF carrier instead of an oscillator. The carrier from the PLL 54 is provided to the transponder control unit 56 to serve as a clock signal. A divided PLL carrier is provided to a synchronous AM demodulator 60. The LF carrier is received by a transponder antenna 57. This transponder antenna 57 has a low Q-factor. This antenna 57 can be an air coil 58 or a coil 58 having a ferrous core, or a core of glass amorphous material. From the transponder antenna 57, the received LF carrier is provided to the PLL 54 as previously mentioned through a bandpass filter 55, and is also provided to the synchronous AM demodulator 60 that will demodulate LF up-link data and provide this data to the transponder control unit 56.

The PLL carrier is also provided to a data recovery unit or a UHF demodulator 62. The UHF demodulator 62 receives a UHF up-link signal from the transponder UHF antenna 14 that receives the UHF up-link message from the interrogator 10. The UHF demodulator 62 provides UHF up-link data to the transponder control unit 56.

The PLL carrier is further provided to a programmable digital divider 64. This programmable digital divider 64 is controlled by the transponder control unit 56 to either divide the PLL carrier by first selected frequency or by second selected frequency depending on the UHF down-link data that the transponder 12 is to send to the interrogator 10. This selectively divided PLL carrier is provided to a back-scatter modulator 66 that controls the transponder reflector 68.

The-transponder reflector 68 is operable to back-scatter modulate a continuous wave UHF signal that is applied by the interrogator 10 to the transponder reflector 68. The UHF down-link message is provided by the transponder control unit 56 from its internal program set or from an attached memory 70, 72. The attached memory may consist of a static RAM 70 or a dynamic RAM 70 or might consist of an electrically erasable programmable read only memory (EEPROM) 72 or another memory or combination of memories.

The transponder PLL 54 will synchronize itself to a LF carrier received by the LF transponder antenna. Even in the absence of the LF carrier, the PLL 54 will continue to oscillate at the center frequency. Thus, without a received LF carrier a system clock is still available to the transponder control unit 56. However, data demodulation for the UHF up-link signal would be of a lower performance.

The transponder antennas 57,68 can be integrated into a single tag or be .inductively coupled to the tag using a small feeder cable. The actual physical mounting of the transponder antenna 57,68 will be dependent upon system design considerations.

Now that the components of the interrogator 10 and the transponder 12 have been described in some detail, the methods available for communicating between the interrogator 10 and transponder 12 will be described with further reference to FIGS. 2 and 3. Again referring to the PLL 22 of the interrogator 10, this PLL receives its frequency reference from the 3600 kHz crystal oscillator 24. Because this oscillator signal is compared with the digitally divided VCO frequency by means of the programmable divider, it follows that the VCO programmable frequency steps in the 915 MHz UHF band are 3600 kHz separated.

The 3600 kHz crystal oscillator 24 also determines the carrier for the 300 kHz data channel by a fixed division of 12. Also, a 1200 kHz and a 600 kHz frequency are derived from the master oscillator 24. These two derived frequencies are used as reference carriers to recover the transponders' subcarrier FSK data from the UHF down-link channel via the first and second mixers 48,50. The UHF carrier in the 300 kHz LF carrier also could be generated by separate local oscillators without phase-locked loops. System performance may be lower in such an arrangement.

As mentioned, the UHF up-link signal is preferably amplitude modulated. The UHF down-link signal comprises a UHF main carrier that is transmitted by the interrogator 10 to the transponder 12 and back-scatter reflected therefrom. The down link signal further comprises two AM side bands centered on this UHF main carrier. Since the transponder 12 works according to the back-scatter method, it will always respond with approximately the same frequency as that which was radiated to it by the interrogator 10. This reflected frequency is, however, shifted by the well-known Doppler effect. This Doppler effect, combined with data from the selected channel beam selected, can be used to calculate the vehicles' speed for enforcement purposes. The shift on the baseband signal would be approximately 280 Hz for a vehicle traveling at 100 mph in using the described UHF carrier frequency.

Again referring to the UHF down-link message, the AM side bands contain a 900 kHz virtual subcarrier. The subcarrier is FSK modulated having a mark frequency of 1200 kHz and a space frequency of 600 kHz. "Mark" and "space" typically referred to a logical one and a logical zero, respectively. These exemplary frequencies allow for a data speed of 300 KBPS for the UHF down-link channel. The UHF data down-link message is converted to the FSK base band by means of a direct conversion balanced modulator 38. This could be done in full duplex operation with the AM modulated up-link signal as long as the UHF up-link fits within a band width of +/− 300 kHz (between the two FSK down-link side bands). If not, only half duplex operation is possible or full duplex in combination with lower data speeds for the UHF AM up-link channel may be used. After conversion to the FSK base band, the FSK base band signal is then demodulated by digital data recovery unit 52 using a sampling technique. The reference sampling clock comes from the 3600 kHz master oscillator 24. In the illustrative embodiment the LF up-link channel will be a 36 KBPS data signal modulated onto the LF carrier. The LF carrier in this embodiment is 300 kHz and is phase-locked with the UHF carrier and derived from the 3600 kHz master oscillator 24. Many other modulation schemes are possible such as pulse-width modulation, or pulse amplitude modulation. Pulse amplitude modulation in combination with grouping techniques could yield a LF data speed increase of a factor of four or more in the same bandwidth. The modulation scheme will be selected based on many factors including transponder controller complexity.

Figure 4:
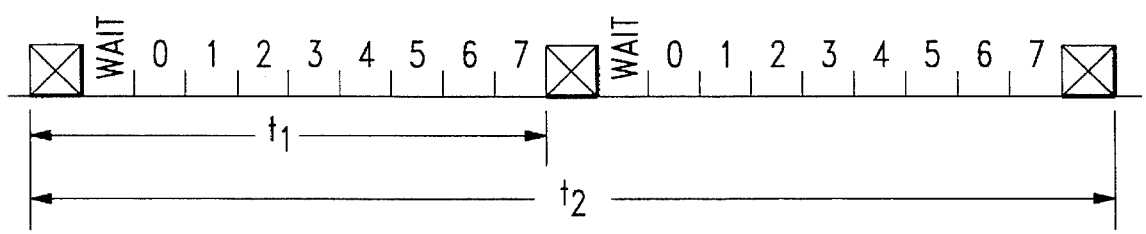
FIG. 4 is a timing diagram for an arrangement of eight interrogator units occupying eight time slots and a time division multiplexing scheme.

Referring now to FIG. 4, the data exchange time sequencing scheme for the dual channel transponder system will be described. In the preferred embodiment every lane is equipped with a LF interrogator antenna for transferring the 300 kHz amplitude modulated data to a transponder 12 within the corresponding lane. The 300 kHz subcarrier is transmitted continuously to serve as a clock signal for the transponder 12 during its travel over the LF interrogator antenna 16. Each interrogator LF antenna 16 preferably sends its own wake-up signal via this 300 kHz carrier. The wake-up signal is then followed by a unique lane code for each antenna/lane pair.

In this embodiment all LF antennas send the wake-up pulses and lane codes simultaneously. In the example shown in FIG. 4, a time-division multiplexing (TDM) scheme allows for up to eight transponders 12 in a system controlled by a single UHF antenna transmitting a single UHF channel carrier. By using multiple interrogators 10 operating with differing UHF channel carriers (frequency division multiplexing) the total number of transponders 12 addressed may be increased or the duration of the time slot in the time division multiplexing (TDM) scheme may be increased without need for each interrogator 10 to use a highly directional antenna.

A transponder 12 receiving its wake-up pulse from the LF antenna 16 is first activated after which it starts its response signal via the UHF down-link to the interrogator 10. However, the transponder's UHF response doesn't immediately follow the wake-up pulse but waits for its appropriate time slot as shown in FIG. 3. For example in FIG. 3 the wake-up pulse is shown as a square with an "X" in it. Following this wake-up pulse, there might be a brief pause and then the zeroeth or highest priority transponder 12 will respond with its response. This continues up through the seventh unit or lowest priority unit. The process can then begin again. The transponder 12 communicates through the UHF link with the interrogator 10 corresponding to the time slot that it chooses according to the lane number that is received through the LF data link. As shown in FIG. 3 this procedure is typically repeated twice to ensure the vehicle 20 is always within the perimeter of the LF interrogator antenna 16 for at least one data exchange cycle. This LF interrogator antenna 16 is typically a loop antenna having a length of approximately three meters.

Using the method described herein, it is possible for a toll plaza 11 to have only one UHF antenna 14 that might be shared among all of the interrogator, simplifying toll plaza installation. A further advantage of this system is that regardless of whether a interrogators 10 is provided for each interrogator 10 or one for the entire group of interrogators 10 mutual interference between transponders from adjacent lanes will not be a problem, since only one transponder 12 will be active at a given time.

The UHF and LF carriers may be transmitted continuously for transponder synchronization purposes. This presents no problem because only one transponder 12 at a time will respond via the UHF down-link. The UHF down-link preferably echoes the lane code back to the interrogator 10 so the interrogator 10 can verify from which lane the transponder 12, responded. In the preferred embodiment the LF signal primarily is used only for the wake-up pulse. An alternative embodiment would be to transmit data during the full cycle. The difficulty in this alternative embodiment is that it would require the transponder controller to handle two simultaneous data communication operations.

As another alternative embodiment the number of time slots could be halved only allowing half as many lanes or interrogators 10. This would allow twice as much data to be exchanged between the interrogator 10 and the transponder 12. To achieve the same maximum number of lanes in this system, however, the use of interrogators 10 operating in common UHF channels would be required. In this case the interrogators 10 using common UHF channels would have to use directional antennas focused on non-overlapping fields.

Figure 5:
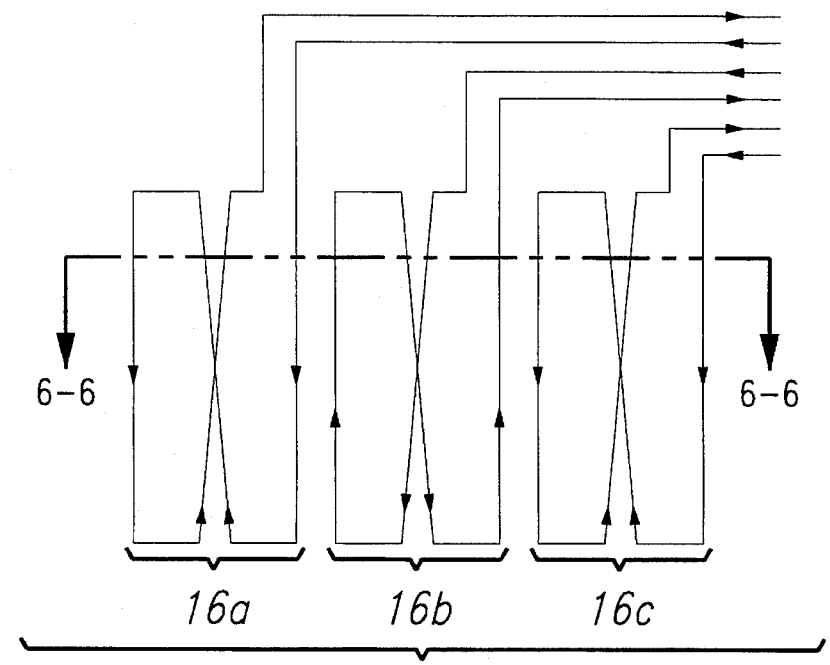
FIG. 5 shows a preferred arrangement of interrogator low frequency antennas.

FIG. 5 shows LF antenna layout for three lanes. The layout of this LF antenna 16 causes a field distribution centered on the two middle conductors of each antenna 16 since the RF current is in the same direction for these middle conductors.

Figure 6:
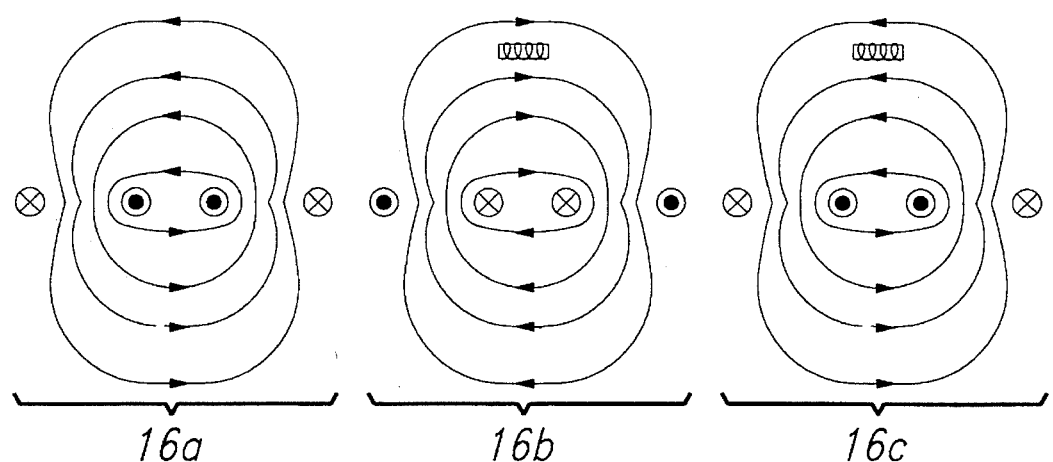
FIG. 6 is a cross sectional view taken through the cross section line of FIG. 5 showing the electromagnetic fields in and around the low frequency antennas.

FIG. 6 shows the field distribution corresponding to a cross section taken in FIG. 5. A transponder antenna 57 is drawn in the field lines to show the optimal coupling position with the ground loop. In this optimal positioning, the transponder 12 would be mounted in the middle of the windshield in a horizontal position. Yet another advantage of this invention is that each LF antenna 16 can be used as a car presence detector. A car traveling across this antenna will cause a slight change in RF current through the loop antenna 16 because of eddy currents induced in the car body. This can be detected in the amplifier stage that is driving the inductive antenna and thus can be used as a trigger for lane enforcement. By using this signal, the presence of a car traveling across the loop having no transponder or a faulty transponder 12 can still be detected.

The sole table, below, provides an overview of the embodiments and the drawings:

TABLE

| Drawing Element | Generic Term | Preferred or Specific Term | Alternate Terms |
| --- | --- | --- | --- |
| 10 | Interrogator | Interrogator | Reader |
| 11 | Toll Plaza | Toll Plaza | Toll Booth |
| 12 | Transponder | Transponder | Responder |
| 14 | UHF Antenna | Interrogator UHF Antenna | |
| 16 | LF antenna | Interrogator LF antenna | Loop Antenna |
| 17 | Interrogator Data Bus | | |
| 18 | Computer | Toll plaza computer | |
| 20 | Vehicle | Vehicle | Automobile |
| 22 | PLL | Interrogator PLL | |
| 24 | Oscillator | Interrogator Oscillator | Master Oscillator, Crystal Oscillator, 3600 kHz Oscillator |
| 26 | Phase Detector | Interrogator PLL Phase Detector | |
| 28 | Divider | Interrogator PLL Divider | |
| 30 | Lowpass Filter | Interrogator PLL Lowpass Filter | LPF |
| 32 | Voltage-Controlled Oscillator | Interrogator PLL Voltage-Controlled Oscillator | VCO |
| 34 | Modulator | Interrogator UHF Modulator | |
| 36 | Controller | Interrogator Controller | Processor |
| 38 | Modulator | Direct-Conversion Balanced Modulator | |
| 40 | Counter | Divide-by-Three Counter | |
| 42 | Counter | First Divide-by-Two Counter | |
| 44 | Counter | Second Divide-by-Two Counter | |
| 46 | Modulator | LF Uplink Modulator | |
| 48 | Mixer | First Mixer | |
| 50 | Mixer | Second Mixer | |
| 52 | Data Recovery Unit | Interrogator Data Recovery Unit | Demodulator |
| 54 | PLL | Transponder PLL | |
| 55 | Bandpass Filter | Transponder PLL Bandpass Filter | |
| 56 | Control Unit | Transponder Control Unit | Processor |
| 57 | Antenna | Transponder Antenna | |
| 58 | Coil | | |
| 59 | Capacitor | | |
| 60 | Demodulator | Synchronous AM Demodulator | |
| 62 | Data Recovery Unit | Transponder Data Recovery Unit | |
| 64 | Divider | Programmable Digital Divider | Transponder Divider |

TABLE-continued

| Drawing Element | Generic Term | Preferred or Specific Term | Alternate Terms |
|---|---|---|---|
| 66 | Modulator | Back-Scatter Modulator | |
| 68 | Reflecter | Transponder Reflecter | |
| 70 | Memory | Transponder Memory | |
| 72 | Non-volatile Memory | EEPROM | |

A few preferred embodiments have been described in detail hereinabove. It is to be understood that the scope of the invention also comprehends embodiments different from those described, yet within the scope of the claims.

For example, the uplink and downlink between the interrogator and transponder might be a half-duplex or a full-duplex data link which might use differing carriers frequencies to avoid cross-channel interference. The transponder might have its own internal, self-maintained oscillator and transmitter. Alternatively, the transponder might back-scatter modulate a continuous wave illumination signal from the interrogator. Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. "Microcomputer" in some contexts is used to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A dual-datalink transponder system, said system comprising:
   a. an interrogator, said interrogator having
      i. a UHF modulator operable to modulate UHF uplink data upon a UHF carrier thereby generating a UHF uplink signal thereupon,
      ii. a UHF antenna for receiving said UHF uplink signal and for transmitting said UHF uplink signal as a UHF wireless uplink message, said UHF antenna further for receiving a UHF wireless downlink message and for generating a UHF downlink signal,
      iii. a UHF demodulator which receives said UHF downlink signal and extracts UHF downlink data therefrom,
      iv. an LF modulator which modulates LF uplink data upon an LF carrier to generate an LF uplink signal,
      v. an LF antenna for receiving said LF uplink signal and for transmitting said LF uplink signal as an LF wireless uplink message, and
      vi. a controller operable to receive said UHF downlink data, to supply said UHF uplink modulator with said UHF uplink data, and to supply said LF uplink data to said LF uplink modulator; and
   b. a transponder, said transponder comprising
      i. an LF antenna for receiving said LF wireless uplink message,
      ii. an LF demodulator which demodulates said LF uplink data from said LF wireless uplink message,
      iii. a UHF antenna operable to receive said UHF wireless uplink message, to derive a transponder UHF uplink signal therefrom, to receive a transponder UHF downlink signal comprising UHF downlink data impressed thereon, and to transmit a wireless downlink message containing said UHF downlink data,
      iv. a UHF modulator that impresses said UHF downlink data upon said UHF antenna to form a transponder UHF downlink signal,
      v. a UHF demodulator operable to receive said transponder UHF uplink signal and to demodulate said UHF uplink data therefrom, and
      vi. a controller for receiving said transponder LF uplink data and said transponder UHF uplink data, said controller further providing said UHF downlink data to said UHF modulator.

2. The transponder system of claim 1 wherein said transponder UHF antenna and said transponder LF antenna form a single physical antenna.

3. The transponder system of claim 1 wherein said interrogator further comprises an LF carrier wave generator for generating said LF carrier and a programmable UHF carrier wave generator for generating said UHF carrier.

4. The transponder system of claim 3 wherein said LF carrier wave generator and said programmable UHF carrier are combined into a phase-locked loop having a programmable divider whereby a first and a second UHF carrier frequencies and said LF carrier may be generated.

5. The transponder system of claim 4 wherein said programmable UHF carrier wave generator is operable to generate a UHF carrier selectable from at least a first, a second, and a third frequency.

6. The transponder system of claim 1 wherein said transponder further comprises a transponder phase-locked loop operating at a frequency which is a multiple of the frequency of said LF carrier and providing as outputs transponder clocks of frequencies comprising said UHF carrier frequency and said LF carrier frequency.

7. The transponder system of claim 1 wherein said transponder further comprises a memory which is in electrical communication with said transponder controller, said memory having data stored therein which may be accessed by said transponder controller and provided to said UHF modulator as UHF downlink data.

8. The transponder system of claim 1 wherein said interrogator further comprises an LF downlink demodulator for receiving an LF downlink message from said transponder via said LF antenna.

9. The transponder system of claim 1 wherein said transponder further comprises an LF downlink modulator for modulating an LF downlink message for transmission to said interrogator via said LF antenna.

10. The transponder system of claim 1 wherein said interrogator LF antenna and said interrogator UHF antenna form a single physical antenna.

11. The transponder system of claim 1 wherein one of said selectable UHF frequencies are 915 MHz.

12. The transponder system of claim 1 wherein said selectable UHF frequencies are separated in frequency by 3.6 MHz.

13. An interrogator for a dual-datalink transponder system, said interrogator comprising:
   a. a UHF uplink modulator operable to modulate UHF uplink data upon a UHF carrier thereby generating a UHF uplink signal;
   b. a UHF antenna for receiving said UHF uplink signal from said UHF uplink modulator and for transmitting said UHF uplink signal as a UHF wireless uplink message, said UHF antenna further for receiving a UHF wireless downlink message and for generating a UHF downlink signal;
   c. a UHF downlink demodulator which receives said UHF downlink signal and extracts UHF downlink data therefrom;
   d. an LF uplink modulator which modulates LF uplink data upon an LF carrier to generate an LF uplink signal;
   e. an LF antenna for receiving said LF uplink signal from said LF uplink modulator and for transmitting said LF uplink signal as an LF wireless uplink message; and
   f. an interrogator controller operable to receive said UHF downlink data from said UHF downlink demodulator, to supply said UHF uplink modulator with said UHF uplink data for modulation upon said UHF uplink signal, and to supply said LF uplink data to said LF uplink modulator for modulation upon said LF uplink signal.

14. A transponder for a dual-datalink transponder system, said transponder comprising:
   a. an LF antenna for receiving an LF wireless uplink message modulated upon an LF carrier,
   b. an LF demodulator which demodulates LF uplink data from said LF wireless uplink message,
   c. a UHF antenna operable to receive a UHF wireless uplink message modulated upon a UHF carrier, to derive a transponder UHF uplink signal therefrom, to receive a transponder UHF downlink signal comprising UHF downlink data impressed thereon, and to transmit a wireless downlink message containing said UHF downlink data,
   d. a UHF modulator that impresses said UHF downlink data upon said UHF antenna to form said transponder UHF downlink signal,
   e. a UHF demodulator operable to receive said transponder UHF uplink signal and to demodulate said UHF uplink data therefrom, and
   f. a controller for receiving said LF uplink data and said transponder UHF uplink data, said controller further providing said UHF downlink data to said UHF modulator.

15. The transponder of claim 14 wherein said transponder further comprises a transponder phase-locked loop operating at a frequency which is a multiple of the frequency of said LF carrier and providing as outputs transponder clocks having frequencies comprising said UHF carrier frequency and said LF carrier frequency.

16. The transponder of claim 14 wherein said transponder further comprises a memory that is in electrical communication with said transponder controller, said memory having data stored therein, which may be accessed by said transponder controller and provided to said UHF modulator as said UHF downlink data.

17. The transponder of claim 14 wherein said transponder further comprises an LF downlink modulator for modulating an LF downlink message for transmission to said interrogator via said LF antenna.

* * * * *